United States Patent
Bennett et al.

(10) Patent No.: US 10,056,742 B1
(45) Date of Patent: Aug. 21, 2018

(54) SYSTEM, METHOD AND APPARATUS FOR SPRAY-ON APPLICATION OF A WIRE PULLING LUBRICANT

(71) Applicant: ENCORE WIRE CORPORATION, McKinney, TX (US)

(72) Inventors: Mark Douglas Bennett, Bonham, TX (US); William Thomas Bigbee, Jr., Melissa, TX (US); Ramon Valenzuela Hernandez, Howe, TX (US)

(73) Assignee: ENCORE WIRE CORPORATION, McKinney, TX (US)

( * ) Notice: Subject to any disclaimer, the term of this patent is extended or adjusted under 35 U.S.C. 154(b) by 1120 days.

(21) Appl. No.: 14/211,540

(22) Filed: Mar. 14, 2014

Related U.S. Application Data

(60) Provisional application No. 61/788,176, filed on Mar. 15, 2013.

(51) Int. Cl.
*H01B 3/44* (2006.01)
*H02G 1/00* (2006.01)

(52) U.S. Cl.
CPC ..................... *H02G 1/00* (2013.01)

(58) Field of Classification Search
None
See application file for complete search history.

(56) References Cited

U.S. PATENT DOCUMENTS

| | | |
|---|---|---|
| 2,276,437 A | 3/1942 | Vaala |
| 2,685,707 A | 8/1954 | Llewellyn et al. |
| 2,930,838 A | 3/1960 | Chizallet et al. |
| 3,064,073 A | 11/1962 | Downing et al. |
| 3,108,981 A | 10/1963 | Clark et al. |
| 3,191,005 A | 6/1965 | Cox, II |
| 3,258,031 A | 6/1966 | French |
| 3,333,037 A | 7/1967 | Humphrey et al. |
| 3,378,628 A | 4/1968 | Garner |
| 3,433,884 A | 3/1969 | Cogelia et al. |
| 3,668,175 A | 6/1972 | Sattler |
| 3,747,428 A | 7/1973 | Waner et al. |
| 3,775,175 A | 11/1973 | Merian |

(Continued)

FOREIGN PATENT DOCUMENTS

| | | |
|---|---|---|
| CA | 2726607 A1 | 12/2009 |
| CN | 202917210 U | 5/2013 |

(Continued)

OTHER PUBLICATIONS

Axel Plastics Research Laboratories, Inc., Product Data Sheet re "Mold Wiz. INT-40DHT" (Approx. 2001) (1 p).

(Continued)

*Primary Examiner* — Nathan T Leong
(74) *Attorney, Agent, or Firm* — Warren Rhoades LLP

(57) ABSTRACT

A system, method, and apparatus lubricating a wire or cable during manufacturing, wherein the wire is aligned with an entry to a spraying enclosure and passes through a first seal of the spraying enclosure. Lubricant is sprayed onto the wire inside of the spraying enclosure while the unapplied, but sprayed, lubricant is collected at the bottom of the spraying enclosure. The wire passes through a second seal of the spraying enclosure, is aligned, and exits from the spraying enclosure.

13 Claims, 14 Drawing Sheets

(56) References Cited

U.S. PATENT DOCUMENTS

| | | |
|---|---|---|
| 3,822,875 A | 7/1974 | Schmedemann |
| 3,849,221 A | 11/1974 | Middleton |
| 3,852,875 A | 12/1974 | McAmis et al. |
| 3,868,436 A | 2/1975 | Ootsuji et al. |
| 3,877,142 A | 4/1975 | Hamano et al. |
| 3,885,286 A | 5/1975 | Hill |
| 3,936,572 A | 2/1976 | MacKenzie, Jr. et al. |
| 4,002,797 A | 1/1977 | Hacker et al. |
| 4,043,851 A | 8/1977 | Holladay et al. |
| 4,057,956 A | 11/1977 | Tolle |
| 4,099,425 A | 7/1978 | Moore |
| 4,100,245 A | 7/1978 | Horikawa et al. |
| 4,137,623 A | 2/1979 | Taylor |
| 4,273,806 A | 6/1981 | Stechler |
| 4,273,829 A | 6/1981 | Perreault |
| 4,274,509 A | 6/1981 | Thomson et al. |
| 4,275,096 A | 6/1981 | Taylor |
| 4,299,256 A | 11/1981 | Bacehowski et al. |
| 4,356,139 A * | 10/1982 | Rowland ............... B01F 5/0602 264/171.19 |
| 4,360,492 A | 11/1982 | Rowland et al. |
| 4,414,917 A | 11/1983 | Bentley et al. |
| 4,416,380 A | 11/1983 | Flum |
| 4,447,569 A | 5/1984 | Brecker et al. |
| 4,449,290 A | 5/1984 | Saunders et al. |
| 4,454,949 A | 6/1984 | Flum |
| 4,461,712 A | 7/1984 | Jonnes |
| 4,475,629 A | 10/1984 | Jonnes |
| 4,522,733 A | 6/1985 | Jonnes |
| 4,547,246 A | 10/1985 | Viriyayuthakorn et al. |
| 4,565,725 A | 1/1986 | Spamer et al. |
| 4,568,420 A | 2/1986 | Nonni |
| 4,569,420 A | 2/1986 | Pickett et al. |
| 4,605,818 A | 8/1986 | Arroyo et al. |
| 4,673,516 A | 6/1987 | Berry |
| 4,684,214 A | 8/1987 | Goldmann et al. |
| 4,693,936 A | 9/1987 | McGregor et al. |
| 4,749,059 A | 6/1988 | Jonnes et al. |
| 4,751,261 A | 6/1988 | Miyata et al. |
| 4,761,445 A | 8/1988 | Chiba |
| 4,773,954 A | 9/1988 | Starnes, Jr. |
| 4,781,847 A | 11/1988 | Weitz |
| 4,806,425 A | 2/1989 | Chu-Ba |
| 4,868,054 A | 9/1989 | Kartheiser |
| 4,902,749 A | 2/1990 | Akkapeddi et al. |
| 4,937,142 A | 6/1990 | Ogushi et al. |
| 4,940,504 A | 7/1990 | Starnes, Jr. |
| 4,952,021 A | 8/1990 | Aoki et al. |
| 4,965,249 A | 10/1990 | De With et al. |
| 5,036,121 A | 7/1991 | Coaker et al. |
| 5,055,522 A | 10/1991 | Ikeda et al. |
| 5,063,272 A | 11/1991 | Sasse |
| 5,074,640 A | 12/1991 | Hardin et al. |
| 5,106,701 A | 4/1992 | Kurosaka et al. |
| 5,130,184 A | 7/1992 | Ellis |
| 5,156,715 A | 10/1992 | Starnes, Jr. |
| 5,190,679 A | 3/1993 | McDonald |
| 5,213,644 A | 5/1993 | Phillips et al. |
| 5,217,795 A | 6/1993 | Sasse et al. |
| 5,225,635 A | 7/1993 | Wake et al. |
| 5,227,080 A | 7/1993 | Berry |
| 5,252,676 A | 10/1993 | Suyama et al. |
| 5,324,588 A | 6/1994 | Rinehart et al. |
| 5,326,638 A | 7/1994 | Mottine, Jr. et al. |
| 5,346,383 A | 9/1994 | Starnes, Jr. |
| 5,356,710 A | 10/1994 | Rinehart |
| 5,383,799 A | 1/1995 | Fladung |
| 5,416,269 A | 5/1995 | Kemp et al. |
| 5,451,718 A | 9/1995 | Dixon |
| 5,460,885 A | 10/1995 | Chu-Ba |
| 5,492,760 A | 2/1996 | Sarma et al. |
| 5,505,900 A | 4/1996 | Suwanda et al. |
| 5,519,172 A | 5/1996 | Spencer et al. |
| 5,561,730 A | 10/1996 | Lochkovic et al. |
| 5,565,242 A | 10/1996 | Buttrick, Jr. et al. |
| 5,614,288 A | 3/1997 | Bustos |
| 5,614,482 A * | 3/1997 | Baker ............... C10M 169/044 508/496 |
| 5,654,095 A | 8/1997 | Yin et al. |
| 5,656,371 A | 8/1997 | Kawahigashi et al. |
| 5,660,932 A | 8/1997 | Durston |
| 5,707,468 A | 1/1998 | Arnold et al. |
| 5,707,770 A | 1/1998 | Tanikawa et al. |
| 5,708,084 A | 1/1998 | Hauenstein et al. |
| 5,733,823 A | 3/1998 | Sugioka et al. |
| 5,735,528 A | 4/1998 | Olsson |
| 5,741,858 A | 4/1998 | Brann et al. |
| 5,753,861 A | 5/1998 | Hansen et al. |
| 5,759,926 A | 6/1998 | Pike et al. |
| 5,795,652 A | 8/1998 | Bell et al. |
| 5,846,355 A | 12/1998 | Spencer et al. |
| 5,852,116 A | 12/1998 | Cree et al. |
| 5,856,405 A | 1/1999 | Hofmann |
| 5,886,072 A | 3/1999 | Linsky et al. |
| 5,912,436 A | 6/1999 | Sanchez et al. |
| 5,925,601 A | 7/1999 | McSherry et al. |
| 5,965,263 A | 10/1999 | Tatematsu et al. |
| 5,981,008 A | 11/1999 | Hofmann |
| 6,039,024 A | 3/2000 | Carlson et al. |
| 6,054,224 A | 4/2000 | Nagai et al. |
| 6,057,018 A | 5/2000 | Schmidt |
| 6,060,162 A | 5/2000 | Yin et al. |
| 6,060,638 A | 5/2000 | Paul et al. |
| 6,063,496 A | 5/2000 | Jozokos et al. |
| 6,064,073 A | 5/2000 | Hoogenraad |
| 6,080,489 A | 6/2000 | Mehta |
| 6,101,804 A | 8/2000 | Gentry et al. |
| 6,106,741 A | 8/2000 | Heimann et al. |
| 6,114,036 A | 9/2000 | Rinehart et al. |
| 6,114,632 A | 9/2000 | Planas, Sr. et al. |
| 6,137,058 A | 10/2000 | Moe et al. |
| 6,146,699 A | 11/2000 | Bonicel et al. |
| 6,157,874 A | 12/2000 | Cooley et al. |
| 6,159,617 A | 12/2000 | Foster et al. |
| 6,160,940 A | 12/2000 | Summers et al. |
| 6,184,473 B1 | 2/2001 | Reece et al. |
| 6,188,026 B1 * | 2/2001 | Cope ............... H01B 7/1885 174/120 C |
| 6,214,462 B1 | 4/2001 | Andre et al. |
| 6,222,132 B1 | 4/2001 | Higashiura et al. |
| 6,228,495 B1 | 5/2001 | Lupia et al. |
| 6,242,097 B1 | 6/2001 | Nishiguchi et al. |
| 6,270,849 B1 | 8/2001 | Popoola et al. |
| 6,281,431 B1 | 8/2001 | Cumley |
| 6,319,604 B1 | 11/2001 | Xu |
| 6,327,841 B1 | 12/2001 | Bertini et al. |
| 6,329,055 B1 | 12/2001 | Higashiura et al. |
| 6,347,561 B2 | 2/2002 | Uneme et al. |
| 6,359,231 B2 | 3/2002 | Reece et al. |
| 6,395,989 B2 | 5/2002 | Lecoeuvre et al. |
| 6,416,813 B1 | 7/2002 | Valls Prats |
| 6,418,704 B2 | 7/2002 | Bertini et al. |
| 6,424,768 B1 | 7/2002 | Booth et al. |
| 6,430,913 B1 | 8/2002 | Gentry et al. |
| 6,437,249 B1 | 8/2002 | Higashiura et al. |
| 6,461,730 B1 | 10/2002 | Bachmann et al. |
| 6,474,057 B2 | 11/2002 | Bertini et al. |
| 6,495,756 B1 | 12/2002 | Burke et al. |
| 6,530,205 B1 | 3/2003 | Gentry et al. |
| 6,534,717 B2 | 3/2003 | Suzuki et al. |
| 6,565,242 B2 | 5/2003 | Dai |
| 6,596,945 B1 | 7/2003 | Hughey et al. |
| 6,640,533 B2 | 11/2003 | Bertini et al. |
| 6,646,205 B2 | 11/2003 | Hase et al. |
| 6,728,206 B1 | 4/2004 | Carlson |
| 6,734,361 B2 | 5/2004 | Mesaki et al. |
| 6,766,091 B2 | 7/2004 | Beuth et al. |
| 6,810,188 B1 | 10/2004 | Suzuki et al. |
| 6,850,681 B2 | 2/2005 | Lepont et al. |
| 6,903,264 B2 | 6/2005 | Watanabe et al. |
| 6,906,258 B2 | 6/2005 | Hirai et al. |
| 6,912,222 B1 | 6/2005 | Wheeler et al. |
| 6,977,280 B2 | 12/2005 | Lee et al. |
| 6,997,280 B2 | 2/2006 | Minoura et al. |

(56) References Cited

U.S. PATENT DOCUMENTS

| | | |
|---|---|---|
| 6,997,999 B2 | 2/2006 | Houston et al. |
| 6,998,536 B2 | 2/2006 | Barusseau et al. |
| 7,053,308 B2 | 5/2006 | Prats |
| 7,087,843 B2 | 8/2006 | Ishii et al. |
| 7,129,415 B1 | 10/2006 | Bates et al. |
| 7,135,524 B2 | 11/2006 | Breitscheidel et al. |
| 7,136,556 B2 | 11/2006 | Brown et al. |
| 7,144,952 B1 | 12/2006 | Court et al. |
| 7,158,707 B2 | 1/2007 | Will et al. |
| 7,208,684 B2 | 4/2007 | Fetterolf, Sr. et al. |
| 7,247,266 B2 | 7/2007 | Bolcar |
| 7,267,571 B1 | 9/2007 | Twigg et al. |
| 7,302,143 B2 | 11/2007 | Ginocchio et al. |
| 7,411,129 B2 | 8/2008 | Kummer et al. |
| 7,485,810 B2 | 2/2009 | Bates et al. |
| 7,490,144 B2 | 2/2009 | Carlson et al. |
| 7,491,889 B2 | 2/2009 | Dinkelmeyer et al. |
| 7,549,474 B2 | 6/2009 | Valenziano et al. |
| 7,555,542 B1 | 6/2009 | Ayers et al. |
| 7,557,301 B2 | 7/2009 | Kummer et al. |
| 7,642,451 B2 | 1/2010 | Bonn |
| 7,678,311 B2 | 3/2010 | Bolcar |
| 7,749,024 B2 | 7/2010 | Chambers et al. |
| 7,776,441 B2 | 8/2010 | Mhetar et al. |
| 7,934,311 B2 | 5/2011 | Varkey |
| 8,043,119 B2 | 10/2011 | Kummer et al. |
| 8,088,997 B2 | 1/2012 | Picard et al. |
| 8,382,518 B2 | 2/2013 | Chambers et al. |
| 8,616,918 B2 | 12/2013 | Chambers et al. |
| 8,658,576 B1 | 2/2014 | Bigbee, Jr. et al. |
| 8,701,277 B2 | 4/2014 | Kummer et al. |
| 2002/0002221 A1 | 1/2002 | Lee |
| 2002/0139559 A1 | 10/2002 | Valls Prats |
| 2003/0195279 A1 | 10/2003 | Shah et al. |
| 2004/0001682 A1 | 1/2004 | Beuth et al. |
| 2004/0254299 A1 | 12/2004 | Lee et al. |
| 2005/0019353 A1 | 1/2005 | Prinz et al. |
| 2005/0023029 A1 | 2/2005 | Mammeri et al. |
| 2005/0107493 A1 | 5/2005 | Amizadeh-Asl |
| 2005/0180725 A1 | 8/2005 | Carlson et al. |
| 2005/0180726 A1 | 8/2005 | Carlson et al. |
| 2006/0065428 A1 | 3/2006 | Kummer et al. |
| 2006/0065430 A1 | 3/2006 | Kummer et al. |
| 2006/0068085 A1 | 3/2006 | Reece et al. |
| 2006/0068086 A1 | 3/2006 | Reece et al. |
| 2006/0088657 A1 | 4/2006 | Reece et al. |
| 2006/0151196 A1 | 7/2006 | Kummer et al. |
| 2006/0157303 A1 | 7/2006 | Reece et al. |
| 2006/0167158 A1 | 7/2006 | Yagi et al. |
| 2006/0191621 A1 | 8/2006 | Kummer et al. |
| 2006/0249298 A1* | 11/2006 | Reece ............... B05D 5/08 174/110 R |
| 2006/0249299 A1 | 11/2006 | Kummer et al. |
| 2006/0251802 A1 | 11/2006 | Kummer et al. |
| 2007/0098340 A1 | 5/2007 | Lee et al. |
| 2007/0207186 A1 | 9/2007 | Scanlon et al. |
| 2008/0066946 A1 | 3/2008 | Kummer et al. |
| 2008/0244925 A1* | 10/2008 | Shin ............... F26B 21/004 34/611 |
| 2008/0268218 A1 | 10/2008 | Lee |
| 2009/0250238 A1 | 10/2009 | Picard et al. |
| 2009/0250239 A1 | 10/2009 | Picard et al. |
| 2010/0044071 A1 | 2/2010 | Murao et al. |
| 2010/0105583 A1 | 4/2010 | Garmier |
| 2010/0230134 A1 | 9/2010 | Chambers et al. |
| 2010/0236811 A1 | 9/2010 | Sasse et al. |
| 2010/0255186 A1 | 10/2010 | Montes et al. |
| 2010/0285968 A1 | 11/2010 | Gregory |
| 2011/0034357 A1 | 2/2011 | Kawata et al. |
| 2011/0144244 A1 | 6/2011 | Lee |
| 2011/0290528 A1 | 12/2011 | Honda et al. |
| 2012/0012362 A1 | 1/2012 | Kim et al. |
| 2013/0168128 A1 | 7/2013 | Lopez-Gonzalez |

FOREIGN PATENT DOCUMENTS

| | | |
|---|---|---|
| EP | 0283132 A2 | 9/1988 |
| EP | 0364717 A1 | 4/1990 |
| EP | 0544411 A1 | 6/1993 |
| EP | 1524294 A1 | 4/2005 |
| FR | 2674364 A1 | 9/1992 |
| IN | 9500996 14 | 3/2010 |
| JP | 61133506 A | 6/1986 |
| JP | 61133507 | 6/1986 |
| JP | 01110013 | 4/1989 |
| JP | 01144504 | 6/1989 |
| JP | 01166410 A | 6/1989 |
| JP | 01307110 | 12/1989 |
| JP | 05266720 | 10/1993 |
| JP | 06057145 | 3/1994 |
| JP | 9045143 A | 2/1997 |
| JP | 09251811 | 9/1997 |
| JP | 1012051 | 1/1998 |
| JP | 1086207 A | 4/1998 |
| JP | 2001264601 A | 9/2001 |
| JP | 2002231065 | 8/2002 |
| JP | 2003323820 | 11/2003 |
| WO | 198900763 A1 | 1/1989 |
| WO | 1991008262 A2 | 6/1991 |
| WO | 1995012885 A1 | 5/1995 |
| WO | 2000040653 A1 | 7/2000 |
| WO | 2001081969 A1 | 11/2001 |
| WO | 2001090230 A1 | 11/2001 |
| WO | 2002043391 A1 | 5/2002 |
| WO | 2003086731 A1 | 10/2003 |
| WO | 2005042226 A1 | 5/2005 |
| WO | 2006015345 A2 | 2/2006 |
| WO | 2006016895 A1 | 2/2006 |
| WO | 2006016896 A1 | 2/2006 |
| WO | 2006118702 A2 | 11/2006 |
| WO | 2006127711 A2 | 11/2006 |
| WO | 2007081372 A1 | 7/2007 |
| WO | 2007084745 A2 | 7/2007 |
| WO | 2009126613 A1 | 10/2009 |
| WO | 2009126619 A1 | 10/2009 |
| WO | 2010107932 A1 | 9/2010 |
| WO | 2010113004 A2 | 10/2010 |

OTHER PUBLICATIONS

CSA Standards Update Service, "Thermoplastic-Insulated Wires and Cables", UL 83, Thirteenth Edition, Nov. 15, 2003, 186 pages.

Decoste, "Friction of Vinyl Chloride Plastics", SPE Journal, vol. 25, Oct. 1969, pp. 67-71.

Dominighaus, "Les Matieres plastiques les plus usuelles," Informations Chimie No. 158, pp. 179-194, 1976.

Dow Corning article "Siloxane additive minimizes friction in fibre optic cable conduit", 2000 (2 pp) (http://www.dowcorning.com).

Dow Corning Product Information sheet re Dow Corning MB40-006 composition. 1997-2005(1 p) (http://www.downcorning.com).

Dow Corning Product Information sheet re Dow Corning MB50-001 composition. Jan. 15, 2001 (6 pp) (http://www.dowcorning.com).

Dow Corning Material Safety Data Sheet: re Dow Corning MB50-008 composition, Mar. 4, 2008 (1 pp) (http://www.dowcorning.com).

Dow Corning Product Information sheet re Dow Corning MB50-321 composition, Jan. 15, 2001 (2pp) (http://www.dowcorning.com).

Dow Corning Product Information sheet re Dow Corning MB50-002 composition, 1997-2014 (4 pp) (http://www.dowcorning.com).

Dow Corning Product Information sheet re Dow Corning MB50-004 composition, Jan. 15, 2001 (4 pp) (http://www.dowcorning.com).

Dow Corning Product Information sheet re Dow Corning MB50-010 composition, Jan. 16, 2001 (2pp) (http://www.dowcorning.com).

Dow Corning Material Safety Data Sheet re Dow Corning MB50-011 composition, Mar. 4, 2008 (1 p) (http://www.dowcorning.com).

(56) References Cited

OTHER PUBLICATIONS

Dow Corning Material Safety Data Sheet sheet re Dow Corning MB50-320 composition, Mar. 4, 2008 (I pp) (http://www.dowcorning.com).

Dow Corning Product information sheets re Dow Corning MB50-313 composition, Nov. 5, 2001 (4 pp) (http://www.dowcorning.com).

Dow Corning Product information sheets re Dow Corning MB50-314 composition, Nov. 5, 2001 (4 pp) (http://www.dowcorning.com).

Dow Corning, "Dow Corning MB50-011 Masterbatch Material Safety Data Sheet Information", 1997-2001.

Dow Corning, "Dow Corning MB50-011 Masterbatch Product Information", Ultra-high Molecular Weight Siloxane Polymer Dispersed in Polymide 6, 1999, pp. 1-3.

European Patent Office, "Extended Search Report for Application No. 06739714.1", dated Nov. 12, 2009.

European Patent Office, Opposition to European Patent Ep 1899988 and accompanying documentation, filed Oct. 22, 2013 (23 pages).

Trotignon et al., "Extrusion des Thermoplastiques", in "Matieres Plastiques", Editions Nathan, 1996, p. 148.

Underwriters Laboratories, Inc., Safety for Nonmetallic-Sheathed Cables, UL 719, 12th Edition, Feb. 9, 2006, pp. 1-42.

Wiles, John, "Clarifying Confusing Cables", Home Power #66, Aug./Sep. 1998.

American Polywater Corporation, "Laboratory Report—American Polywater Spurt Spray Lubricant Test Compared to Polywater J and NN", Aug. 9, 2005, 6 pages.

American Polywater Corporation, "Polywater J Specification", Aug. 2010, 4 pages.

American Polywater Corporation, "Polywater Spy Cable Lubricant—Technical Specification", May 2008, 4 pages.

American Polywater Corporation, "Polywater SPY Lubricant—Technical Report", Feb. 26, 2008, 4 pages.

General Electric Company, Brochure entitled "GE Silicones-Fluids, Emulsions & Specialties", (2001) (19 pp).

Ideal Industries GmbH, "Yellow 77" Document, 2003, 1 page.

Wild, Frank, "The Effects of Silicone Polymer Additions on the Processing and Properties of an Isotactic Propylene Homopolymer", Sep. 1995, 102 pages.

\* cited by examiner

SYSTEM, METHOD AND APPARATUS FOR SPRAY-ON APPLICATION OF A WIRE PULLING LUBRICANT

CROSS-REFERENCE TO RELATED APPLICATIONS

This application claims the benefit of U.S. Provisional Application Ser. No. 61/788,176, filed Mar. 15, 2013, entitled SYSTEM, METHOD AND APPARATUS FOR SPRAY-ON APPLICATION OF A WIRE PULLING LUBRICANT, of which the entirety is incorporated herein by reference.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

This invention relates to wire and cable. More specifically, it relates to a system, method, and apparatus for spray-on application of a pulling lubricant to a wire or cable, causing a reduced coefficient of friction and reduced pulling force to aid in the installation of wire or cable.

2. Description of Related Art

Wires and cables used in housing and industrial projects typically include a core, such as an electrical conductor, surrounded by at least one additional layer of material creating an outer jacket, which is most often formed by an extrusion process. Installation of wire or cable requires the wire or cable to be threaded or passed through sections of a building, such as walls, ceilings, ducts, cable trays, or conduits. During installation of wires or cables, increased effort is required to pull the wires or cables through the conduit due to friction between the materials involved. This friction may result in damage of the wire or cable during the installation process.

Currently, various methods are used to minimize the coefficient of friction on the surface of the wire or cable to reduce the amount of pulling force required, thereby making it easier to pull through conduits, cable trays, or other building structures during installation. Such prior art methods include manually applying a lubricant to the wire or cable at the job site just prior to installation and incorporating a lubricant into the outer jacket material, prior to formation of the outer jacket. These methods, however, are only effective to varying extents and can be time consuming, wasteful, messy, complicated, expensive, and can require additional equipment at either the job site or manufacturing site. These methods can also sometimes affect aesthetic quality of the final wire or cable product.

Therefore, a need exists for a method and apparatus of applying a pulling lubricant to a wire or cable that reduces the coefficient of friction and effective pulling force required during installation that does not require hand lubricating techniques or complex mixing of lubricant and jacket material.

BRIEF SUMMARY OF THE INVENTION

The invention provides for a system, apparatus, and method to spray-on a pulling lubricant onto a wire or cable during the manufacturing process giving the wire or cable the characteristics of having a reduced coefficient of friction and a reduced pulling force during wire and cable installation. The lubricant is sprayed onto the outer surface of a wire or cable in an enclosure that prevents excess lubricant from escaping the enclosure as well as preventing contaminants from entering the enclosure. Through the prevention of excess lubricant dispersal, a safer and more efficient manufacturing area is maintained. A spraying chamber and drying chamber are formed by the enclosure. Once the wire enters the spraying chamber, adjustable nozzles spray a fine mist of lubricant onto the wire. The spraying chamber encloses the finely sprayed mist, reducing wasted lubricant. The wire then enters the drying chamber where air dries the excess moisture from the spray-on lubricant dispersed upon the wire or cable. Excess dispersant is evaporated and no lubricant exits the drying chamber other than what has been deposited onto the wire. In another embodiment of the present invention, only a spraying chamber is formed by an enclosure. Excess lubricant not deposited onto the wire is collected at the base of the enclosure and may be removed from the enclosure or reused on subsequent wire. The lubricant is sprayed by a spraying system that includes an air system and a lubricant pump system. The air system provides air to aerosolize the lubricant into a mist and to power the lubricant pump system. The lubricant pump system filters the lubricant and pumps the lubricant to spraying nozzles to be combined with air to form a mist.

BRIEF DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown.

In the drawings.

DETAILED DESCRIPTION OF THE INVENTION

Figure 1:
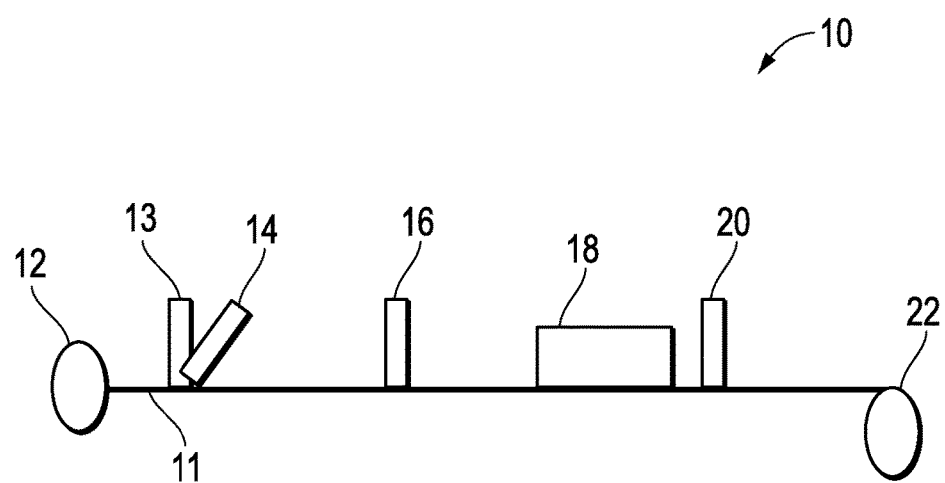
FIG. 1 depicts an overview of a wire or cable manufacturing process in accordance with one embodiment of the present invention.
Figure 2:
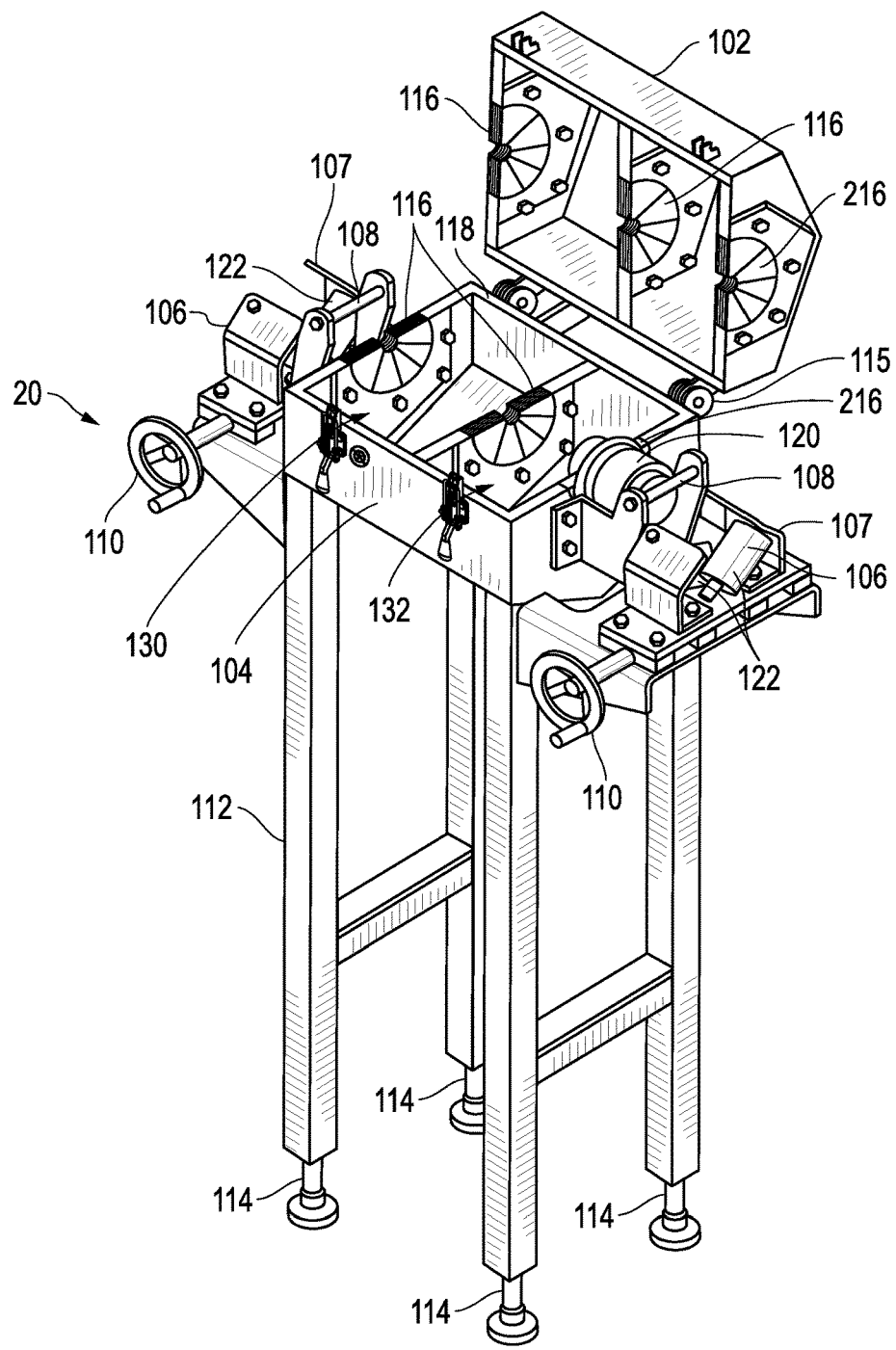
FIG. 2 depicts one embodiment of the lubricant applying apparatus.

Before explaining at least one disclosed embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed are for purpose of description and should not be regarded as limiting.

It should be understood that any one of the features of the invention may be used separately or in combination with other features. Other systems, methods, features, and advantages of the present invention will be or become apparent to one with skill in the art upon examination of the drawings and the detailed description. It is intended that all such additional systems, methods, features, and advantages be included within this description, be within the scope of the present invention, and be protected by accompanying claims.

The present disclosure is described below with reference to the Figures in which various embodiments of the present invention are shown. The subject matter of the disclosure may, however, be embodied in many different forms and should not be construed as limited to the exemplary embodiments set forth herein. It is also understood that the term "wire" is not limiting, and refers to wires, cables, electrical lines, or any other materials that are dispensed from a reel.

The present invention provides for a method and apparatus for spraying a pulling lubricant onto a wire during the manufacturing process. With the use of the system or apparatus or by the disclosed method, the wire or cable gains a characteristic of a reduced coefficient of friction such that when installed, by pulling through sections of building walls, ceilings, ducts, cable trays, and other conduits, the force required to pull the cable is advantageously reduced.

Referring to FIG. 1, a diagram is depicted that illustrates a system, method and apparatus of manufacturing wire or cable insulated with a composition of polymerized nylon and lubricated in accordance with one embodiment of the present invention. In this embodiment, a standard payoff reel 12 to supply an internal conductor(s) 11, such as a copper or aluminum wire is provided in system 10. The standard payoff reel 12 supplies the internal conductor(s) 11 to a first extruder 13 to apply at least an insulating material and an outer jacket over the internal conductor(s) 11. First extruder 13 may be a single extruder head, a plurality of extruders, a cross head, a co-extrusion head or any combination thereof. The insulating material may be thermoset, thermoplastic, elastomeric, polymeric dielectric, polyvinylchloride (PVC), or a semiconductor compound or any combination thereof. The outer jacket may be an additional insulating material or a composition of polymerized nylon.

A second extruder 14 can also be utilized in system 10 to apply, as necessary or desired, an additional layer of insulating material over the internal conductor(s) 11 that may similarly comprise a thermoset, thermoplastic, elastomeric, polymeric dielectric, polyvinylchloride (PVC) or a semiconductor compound or any combination thereof. The second extruder 14 can also function in the system 10 to apply a further additional layer, such as, but not limited to the pelletized composition of polymerized nylon over the wire or cable to form an outer jacket.

A third extruder 16 may also be provided in system 10 to apply a further additional layer of thermoplastic or thermoset material, elastomeric, polymeric dielectric, polyvinylchloride (PVC), or a semiconductor compound or any combination thereof. Alternatively, the third extruder 16 can also be used to extrude a further additional layer, such as, but not limited to the pelletized composition of polymerized nylon over any prior extruded layers or materials. It is contemplated by the present invention that even further additional optional extruders may be provided for additional material application to the wire and cable.

After the insulating material and the outer jacket are applied, the wire or cable is supplied to a cooling device 18 for cooling the applied insulating material and outer jacket of the wire or cable. In one disclosed embodiment, the cooling device 18 is a water trough or similar device that contains a cooling material such as water. The cooling device 18 functions to cool and lower the temperature of the insulating material and outer jacket of the wire or cable as it departs extruder 13 and/or second extruder 14 and/or the third extruder 16 and enters the cooling device 18 by removing latent heat caused by extrusion. The cooling of insulating material and outer jacket provides a more stable polymeric state for later processing. In one disclosed embodiment, the insulating material is cooled to an ambient temperature, such as a temperature of less than 85 degrees Fahrenheit.

After the wire or cable is cooled in the cooling devise 18, the wire or cable enters a spray enclosure 20. Upon entering the spray enclosure 20, the wire or cable enters a spraying chamber wherein adjustable nozzles spray a lubricant onto a wire. In one disclosed embodiment, the lubricant is a siloxane-based lubricant; however, a variety of spray-on lubricants can be utilized without detracting from the spirit of the invention. The wire or cable continues to a drying chamber where air dries the wire or cable. Passing through the drying chamber, the wire or cable exits through an air knife such that excess dispersant is further evaporated and no lubricant exits the spray enclosure 20 other than what has been deposited onto the wire or cable.

After the spray enclosure 20, a motor-driven reel 22 winds up the resulting wire or cable. The resulting wire or cable is reeled by the motor-driven reel 22 and wrapped in plastic film for distribution or storage.

Referring now to FIGS. 2, 3, 4, 5A and 5B by way of non-limiting example, one embodiment of a spray enclosure 20 is disclosed. In this one disclosed embodiment, the spray enclosure 20 is formed by a top portion 102 and bottom portion 104. In this disclosed embodiment, the top portion 102 is attached to the bottom portion 104 through hinges 115, however, a wide variety of attachment means are known to those skilled in the art, including but not limited to bolts and nuts. The enclosure is supported by a stand 112 and feet 114. In one disclosed embodiment, the feet 114 are adjustable to accommodate inclusion in an existing manufacturing assembly line. In another disclosed embodiment, the stand 112 is manufactured in a variety of heights relative to accommodate existing manufacturing lines. Additionally, the feet 114 in one disclosed embodiment are of a screw-type that are known in the art. It is understood by a person of ordinary skill in the art that a variety of structures can be used to adjust the height of the enclosure, including but not limited to locking pin-type adjustment legs, friction-based adjustment legs, or gear-crank type devices.

The wire or cable is aligned to the spray enclosure 20 prior to entry and after exit by the alignment assembly 107. The alignment assembly 107 includes an upper stop 108 and an adjustable lower guide 106 which includes guide rollers 122. The alignment assembly 107 aligns the wire or cable for entry into and exit from the spray enclosure 20. The adjustable lower guide 106 is adjusted by an adjustment wheel 110, which adjusts the distance between the upper stop 108 and the adjustable lower guide 106. It is understood by a one of ordinary skill in the art that the adjustable lower guide may be adjusted by a variety of means without detracting from the spirit of the invention. When properly aligned, the wire or cable passes through the spray enclosure 20 with limited lateral or horizontal movement.

The bottom portion 104 and top portion 102 of the spray enclosure 20 may include a gasket 118 to form a seal between the bottom portion 104 and the top portion 102 of the spray enclosure 20. This gasket may be rubber, or any other material known in the art to seal the two portions.

The spray enclosure 20 is divided into a spraying chamber 130 and a drying chamber 132. An entry opening of the spraying chamber 130 is formed by slit rubber grommets 116 that form a seal around the wire as it enters the spraying chamber 130. In one disclosed embodiment, the slit rubber grommet 116 is of a material pliable enough to accept a wide variety of wire diameters. In another disclosed embodiment, the slit rubber grommets 116 of various entry opening sizes are placed into the spraying chamber 130 dependent upon the size of the wire being manufactured. The slit rubber grommets 116 form a seal around the wire such that spraying lubricant does not escape the spraying chamber 130 through the entry opening. An additional slit rubber grommet 116, with the same properties described above, partitions the spraying chamber 130 from the drying chamber 132. As the wire exits the drying chamber 132, it passes though an air knife 120, which assists in drying and keeping aerosolized lubricant from exiting the spray enclosure 20. An exit grommet 216 forms around the air knife 120 at the exit opening of the drying chamber 132. The exit grommet 216 possesses the same properties described above regarding the slit rubber grommets 116.

Figure 3:
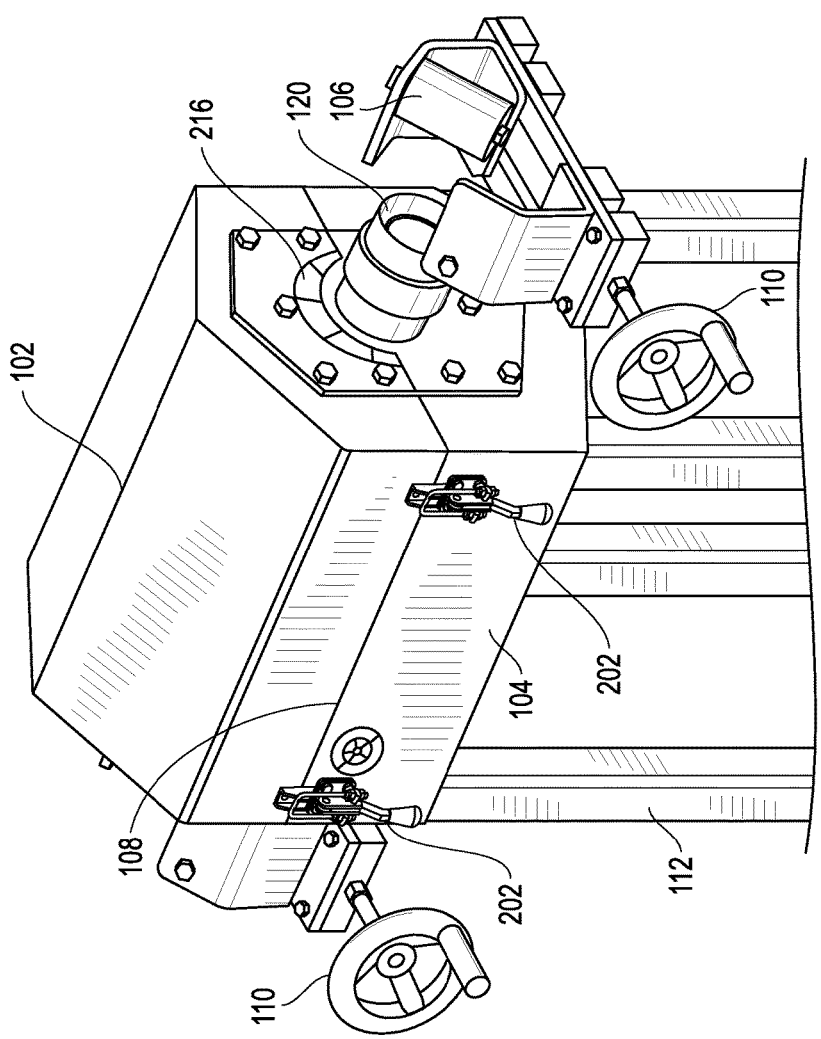
FIG. 3 depicts the lubricant applying apparatus in a closed position.

Referring to FIG. 3, the spray enclosure 20 of one disclosed embodiment is shown when the spray enclosure 20 is closed and sealed. The top portion 102 is closed and latched to the bottom portion 104 such that a seal is formed between the top portion 102 and bottom portion 104. Latches 202 secure the spray enclosure 20 in the closed position. A wide variety of securing mechanisms are known to one skilled in the art and may be implemented without detracting from the spirit of the invention. The exit grommet 216 fits over the end of the air knife 120, providing a seal around the air knife 120 so that aerosolized lubricant does not escape the exit opening of the spray enclosure 20.

Figure 4:
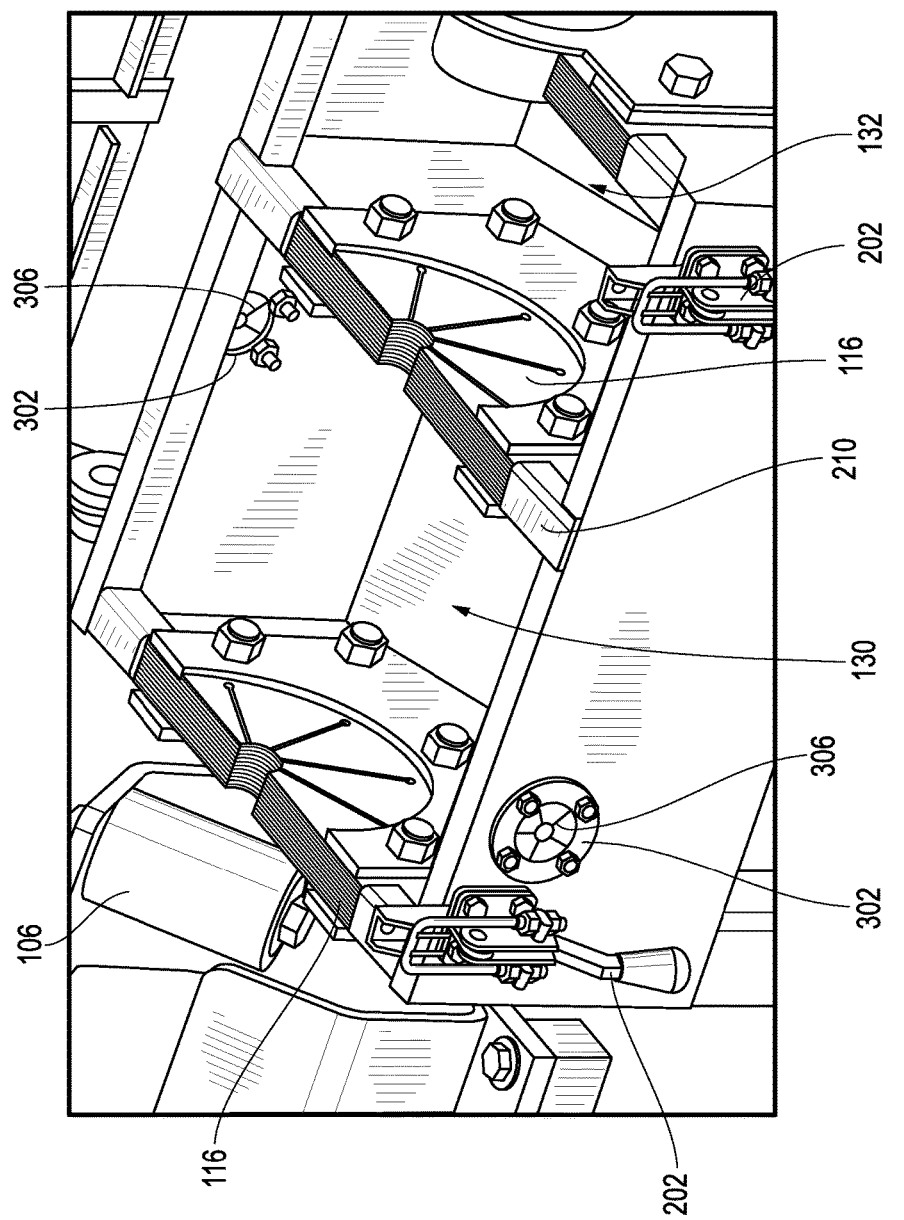
FIG. 4 depicts a spraying chamber and a drying chamber on the lubricant applying apparatus.

Referring now to FIG. 4, a spraying chamber 130 and drying chamber 132 of the spray enclosure 20, according to one disclosed embodiment of the present invention, is shown. The spraying chamber 130 and drying chamber 132 are separated by a wall 210 and the slit rubber grommet 116 is provided to seal the spraying chamber 130 from the drying chamber 132. As the wire moves through the spray enclosure 20, excess lubricant is collected at the bottom of the spray enclosure 20 while reducing the amount of lubricant transmitted to the other chambers or outside of the spray enclosure 20. Two sprayer ports 302 are provided in the spraying chamber 130 to allow for sprayer nozzles. A first sprayer port 302 is located on the front wall of the spraying chamber 130 and a second sprayer port 302 is located on the rear wall of the spray chamber 130. The two sprayer ports 302 are offset, however, a variety of locations and amounts of sprayer ports do not detract from the spirit of the invention. Sprayer grommets 306 form seals around the sprayer nozzles to reduce the amount of aerosolized lubricant escaping from the spraying chamber 130.

Figure 5A:
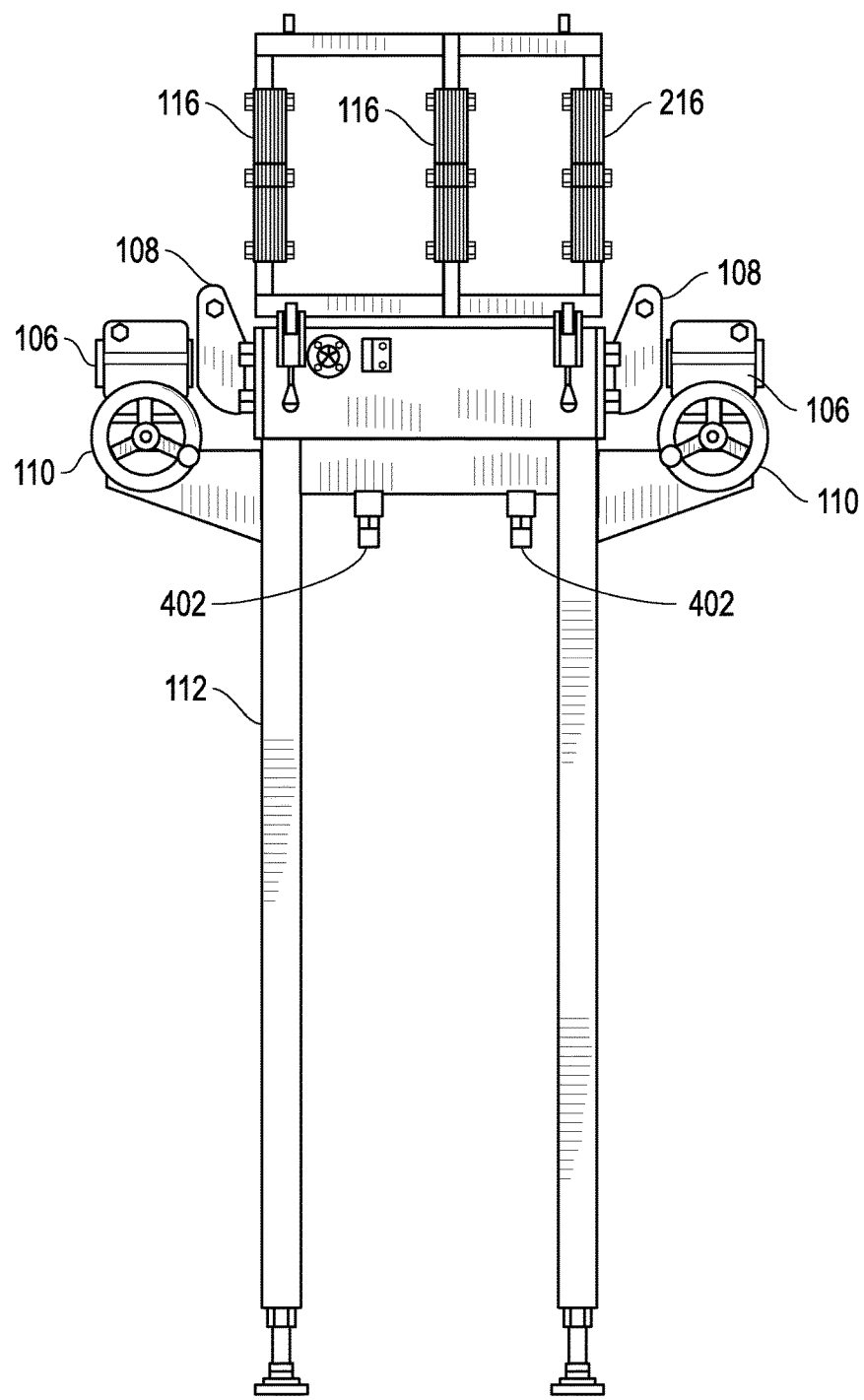
FIG. 5A depicts a front view of the lubricant applying apparatus.
Figure 5B:
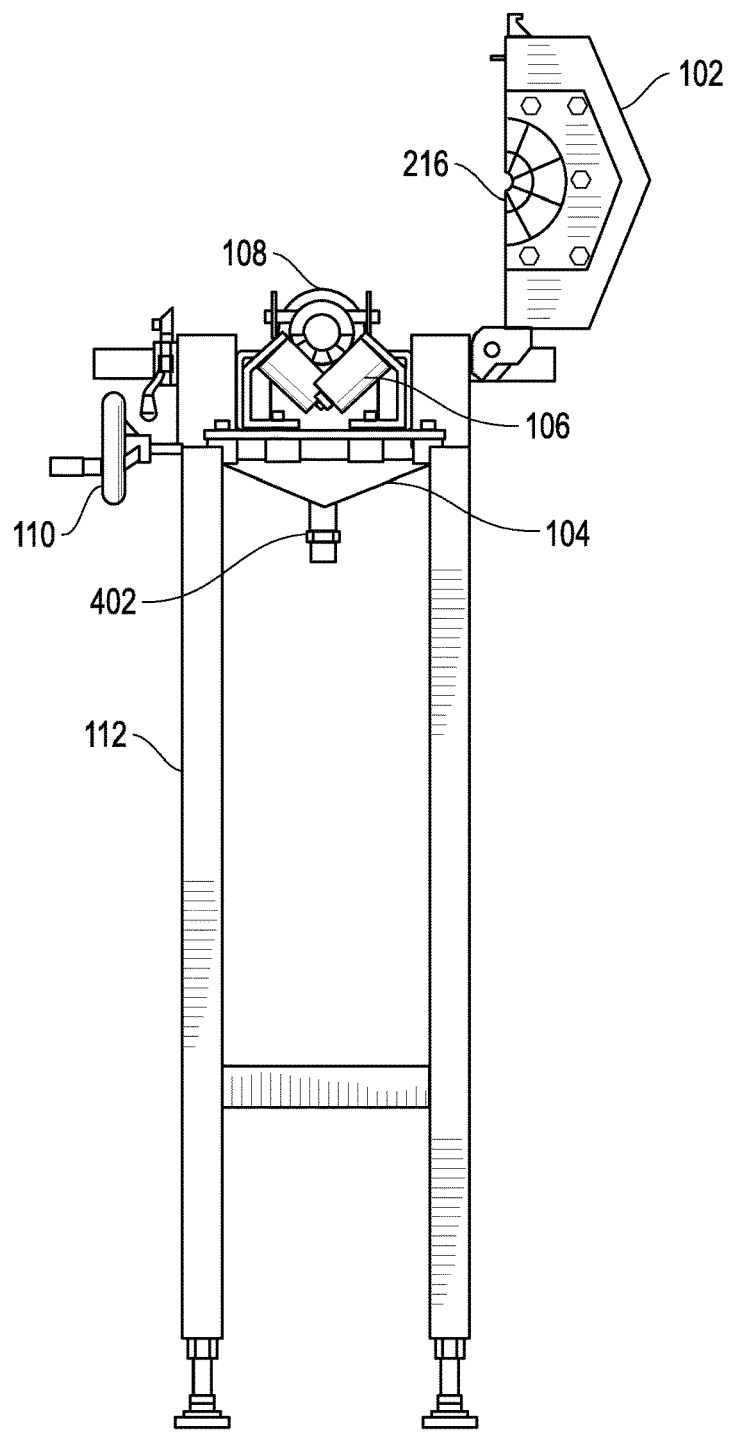
FIG. 5B depicts a side view of the lubricant applying apparatus.

Referring now to FIGS. 5A and 5B, front and side views of the spray enclosure according to one disclosed embodiment of the present invention are shown. The bottom portion 104 is sloped downward from the edges to the middle such that the lubricant not attaching to the wire collects at the center of the bottom of the bottom portion 104. Connectors 402 are attached to the lowest point of the bottom of the bottom portion 104 and provide drainage connection for the spraying chamber 130 and the drying chamber 132. The connectors 402 may be push-lok tube connectors or other connectors well known in the art. The unused, collected lubricant may be withdrawn from the sprayer enclosure 20 for reuse or disposal.

Figure 6:
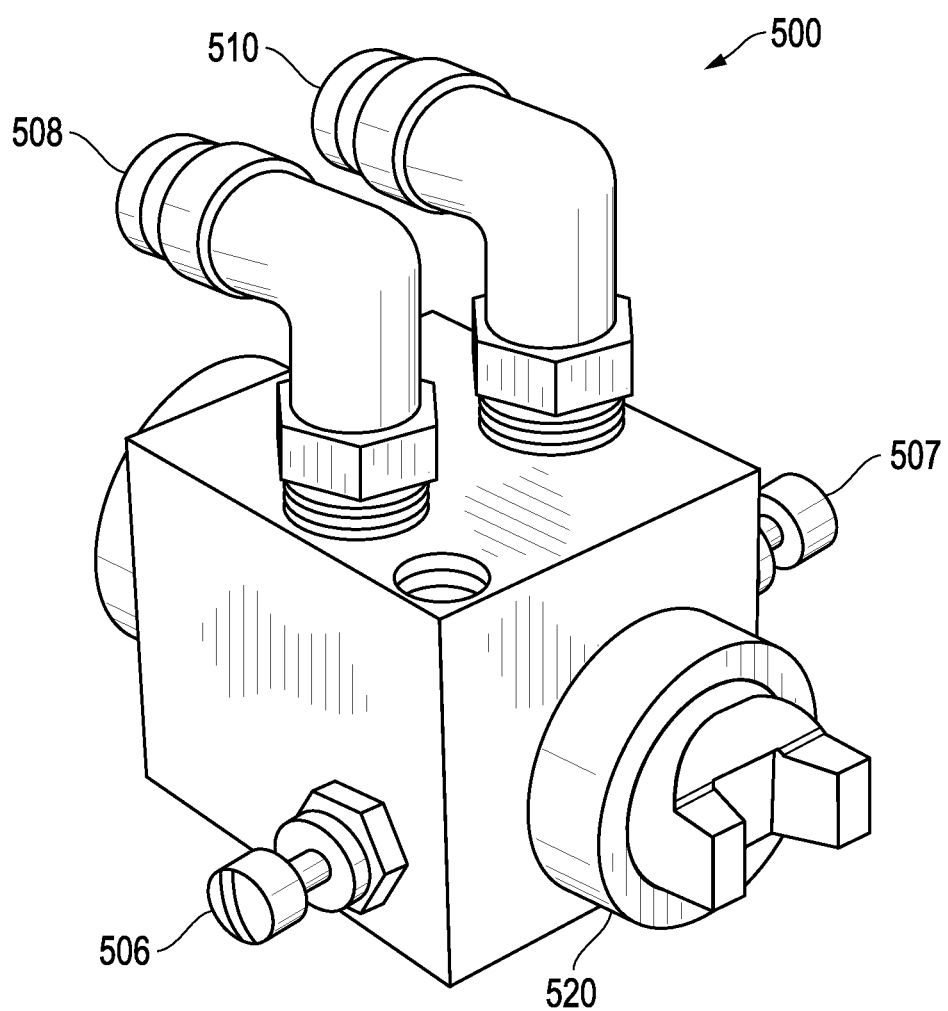
FIG. 6 depicts a spray nozzle of the lubricant spraying component.

Referring to FIG. 6, a spray nozzle for use in the sprayer enclosure is shown. A spraying nozzle 500 includes a lubricant connection 508 and a compressed air connection 510. A lubricant and air are combined within the nozzle 500 and the combination is sprayed in the spraying chamber 130 of the sprayer enclosure 20. The spraying nozzle 500 has a flow adjustment knob 506 and a fan speed adjustment mechanism 507 to control the mixture of the lubricant and air sprayed as well as the speed of the fan. A dispersion adjustment mechanism 520 is provided to modify the dimension and granularity of the sprayed lubricant. A wide variety of commercially available nozzles may be implemented without detracting from the spirit of the invention, including but not limited to a spray nozzle, model number MCI700 manufactured by NOGA.

Figure 7:
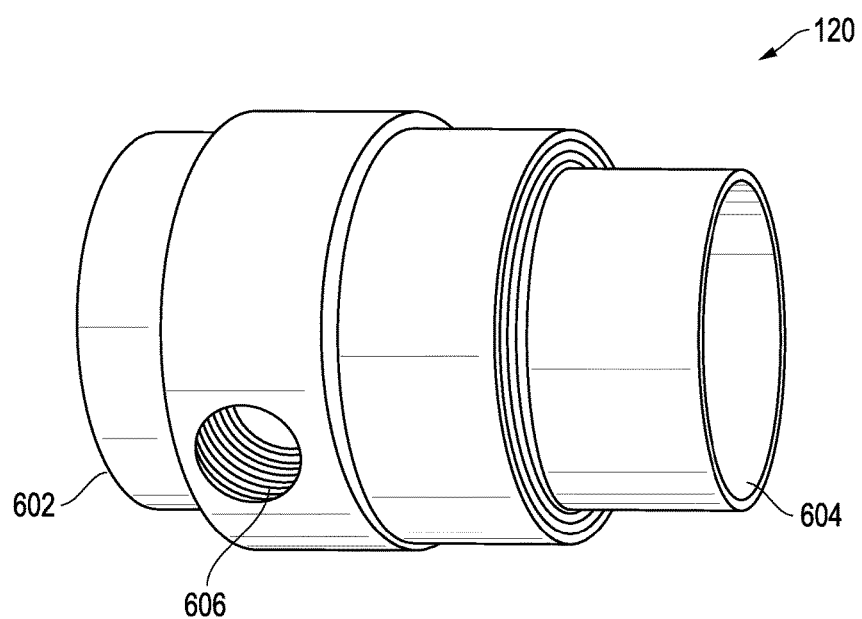
FIG. 7 depicts an air knife of the lubricant spraying component.

Referring to FIG. 7, an air knife for use in the sprayer enclosure is shown. The air knife 120 is located at the exit opening of the sprayer enclosure 20. The air knife 120 is used to blow off excessive lubricant from the wire or cable. The air knife 120 has a suction end 602 and an output end 604. Air is pulled into the suction end 602 and exits the output end 604 of the air knife 600 which is inside the drying chamber 132 of the sprayer enclosure 20. The air knife 120 has a compressed air inlet 606 in order to create additional air flow from the suction end 602 to the output end 604. The air knife 120 is installed in the sprayer enclosure 20 at the exit opening of the drying chamber 132 oriented so that the output end 604 is inside the drying chamber 132 and the suction end 602 is outside of the sprayer enclosure 20. In this configuration, a positive pressure is maintained in the drying chamber 132. The air knife 120 acts both to dry the lubricant and maintain a thin lubricant application on the wire or cable and, by maintaining a positive pressure in the drying chamber 132, preventing aerosolized lubricant from exiting the drying chamber 132. A wide variety of air knifes may be implemented without detracting from the spirit of the invention, including but not limited to, the VorTec Transvector Jet Model 903XSS. In one disclosed embodiment, an air filter is provided in the air knife 120 to remove debris or contaminants entering the air knife 120 through the suction end 602 or compressed air inlet 606.

Now referring to FIGS. 2, 3, 4, 5A and 5B, the sprayer enclosure 20 both prevents unused lubricant from exiting the sprayer enclosure 20 and prevents external contaminants from entering the sprayer enclosure 20. The slit rubber grommets 116, exit grommet 216, rubber gasket 118, and the air knife 120 seal the sprayer enclosure 20 from external contaminants and prevent the escape of lubricant which would contaminate the remainder of the manufacturing site. The downward slope of the bottom portion 104 allows unused lubricant to collect at the lowest point of the bottom portion 104. The lubricant then travels through the connectors 402 into a collection vessel such as a flexible tube and closed container. The unused lubricant is uncontaminated and may be recycled and used in later applications or disposed of in a safe, clean manner. It is a goal of the present invention to provide cost savings by allowing for the recycling of previously sprayed lubricant.

Figure 8:
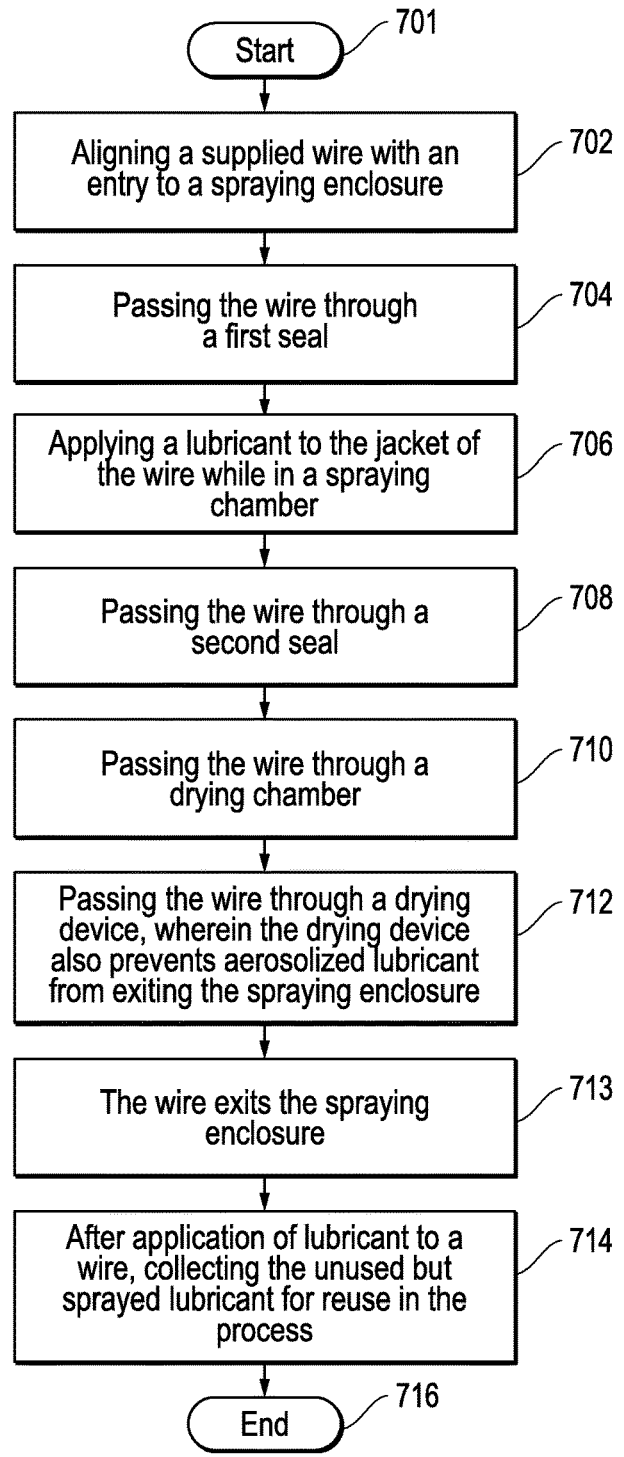
FIG. 8 depicts a method of applying a spray-on lubricant according to one embodiment of the present invention.

FIG. 8 illustrates a method for the spray-on application of a lubricant to a wire. The method begins with Start 701. The wire with an extruded outer jacket is aligned with the entry opening of the spraying enclosure in step 702. Next, the wire passes through a first seal designed to prevent contaminants from entering the chamber or lubricant from exiting the chamber in step 704. The lubricant is sprayed onto the jacket of the wire while inside the spraying chamber in step 706. Next, in step 708, the wire passes through a second seal. The wire enters a drying chamber in the step 710. In step 712, the wire passes through a drying device, wherein the drying device also prevents aerosolized lubricant from exiting the spraying enclosure. The wire exits the sprayer enclosure in step 713. In step 714, the unused lubricant that has been sprayed is collected in the bottom of the sprayer enclosure for reuse. The method Ends in step 716.

Figure 9A:
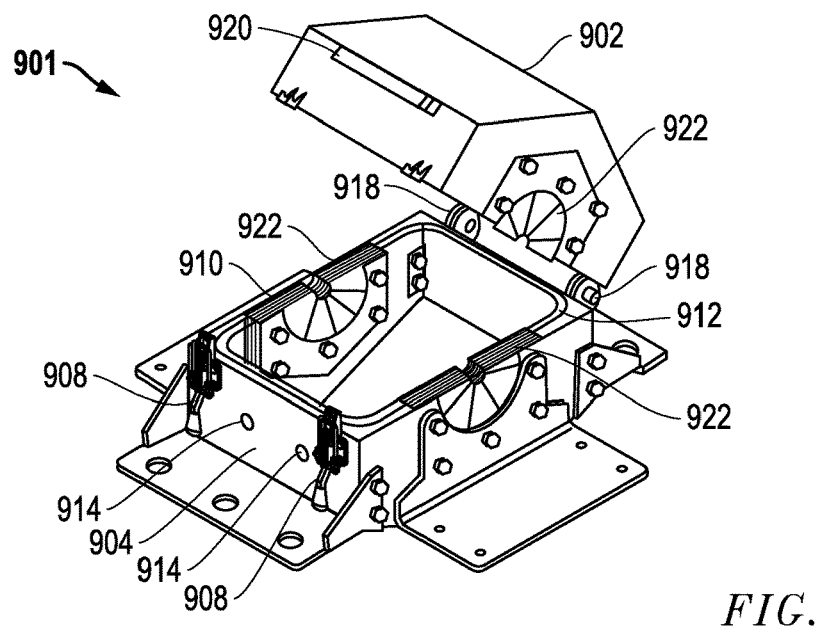
FIG. 9A depicts one embodiment of the lubricant applying apparatus.
Figure 9B:
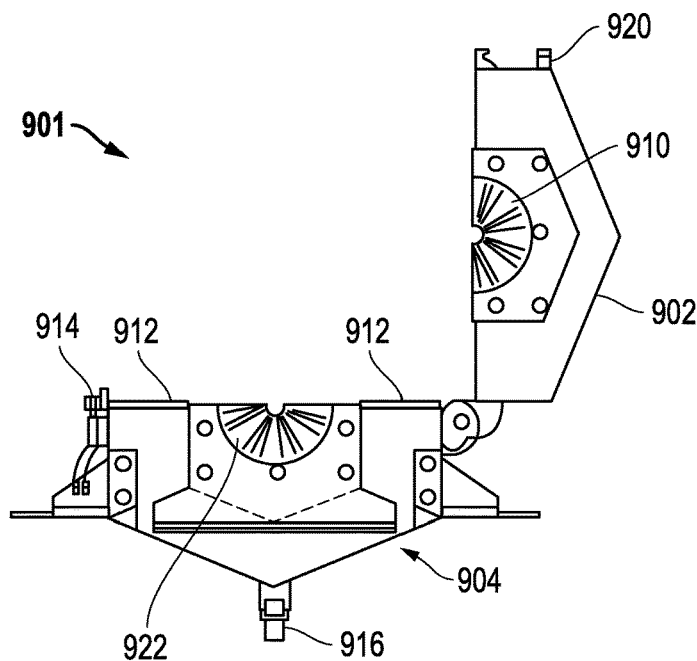
FIG. 9B depicts a side view of the lubricant applying apparatus.
Figure 10:
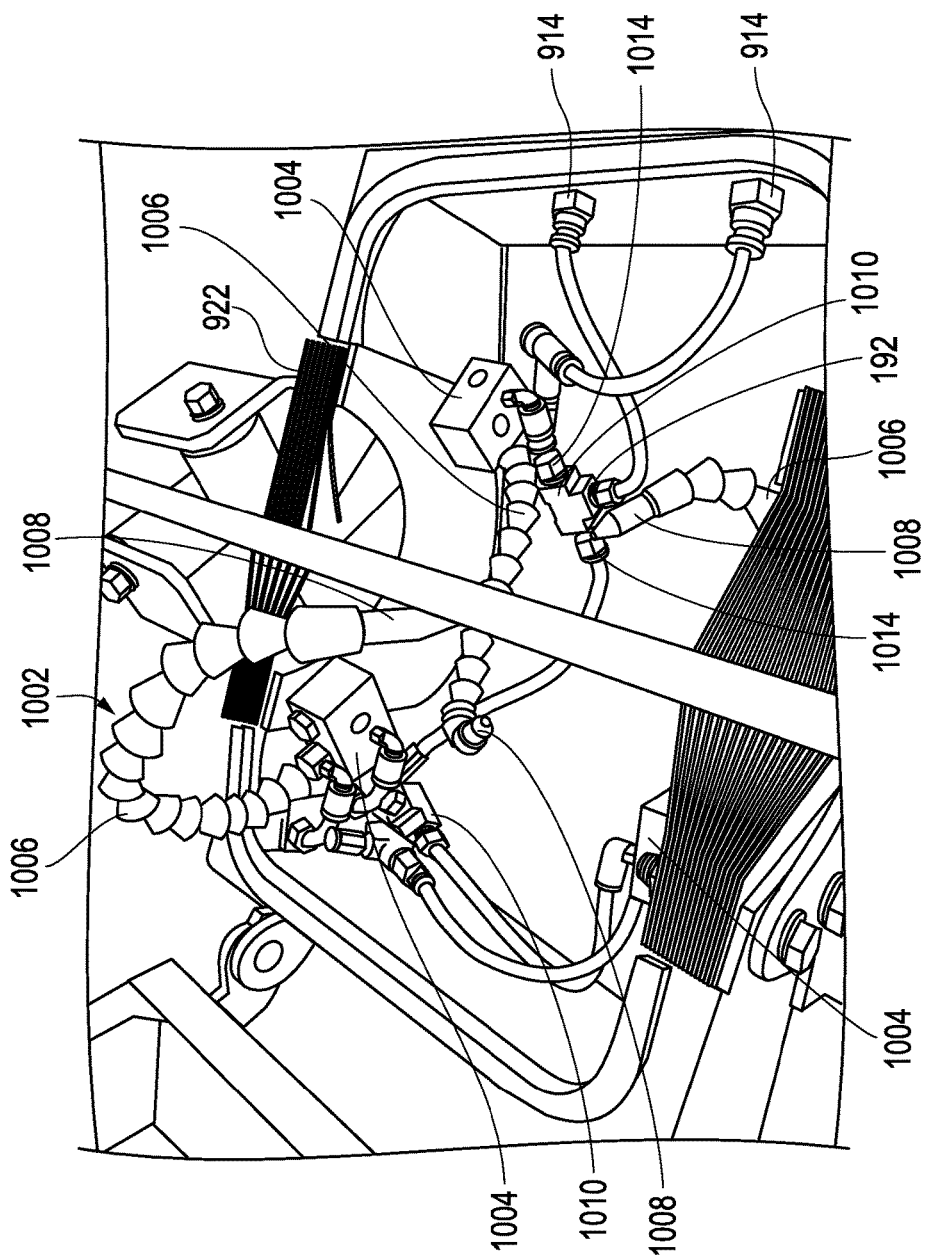
FIG. 10 depicts an internal view of the lubricant applying apparatus.

Referring now to FIGS. 9A, 9B, and 10 by way of non-limiting example, an alternate embodiment of a spray enclosure 901 is disclosed. In this one disclosed embodiment, the spray enclosure 901 is formed by a top portion 902 and bottom portion 904. In this disclosed embodiment, the top portion 902 is attached to the bottom portion 904 through hinges 918. As discussed herein, the enclosure may be supported by a stand 112 and feet 114. Moreover, the wire or cable may be aligned to the spray enclosure 901 prior to entry and after exit by the alignment assembly 107.

The bottom portion 902 and top portion 904 of the spray enclosure 901 may include a gasket 912 to form a seal between the bottom portion 902 and the top portion 904 of the spray enclosure 901. This gasket may be rubber, or any other material known in the art to seal the two portions. The bottom portion 902 and the top portion 904 of the spray enclosure 901 may be secured in a closed position by latches 908. A wide variety of securing mechanisms are known to one skilled in the art and may be implemented without detracting from the spirit of the invention. Further, a handle 920 is attached to the top portion 902 of the spray enclosure 901 to facilitate the opening and closing of the spray enclosure 901. The handle 920 is fastened to the top portion 902 by nuts and bolts, but may be attached in many ways which are known to those skilled in the art.

In this disclosed embodiment, the spray enclosure 901 is comprised of a single spraying chamber 910. The entry and exit openings of the spraying chamber 910 are formed by slit rubber grommets 922 that form a seal around the wire as it enters and exits the spraying chamber 910. As disclosed above, these slit rubber grommets 922 may be of a material pliable enough to accept a wide variety of wire diameters or, in another embodiment, slit rubber grommets 922 may be of various sizes and placed into the spraying chamber 910 dependent upon the diameter of the wire being manufactured. The slit rubber grommets 922 form a seal around the wire such that spraying lubricant does not escape the spraying chamber 910 through the entry or exit openings.

Sprayer ports 914 are provided in the spraying chamber 910 to allow for tubing to provide lubricant and compressed air to sprayer nozzles. In one disclosed embodiment, the sprayer ports 914 are located on the front wall of the spraying chamber 910, however, a variety of locations and amounts of sprayer ports do not detract from the spirit of the invention. The sprayer ports 914 may be of slit rubber grommets as previously disclosed such that the a seal is formed around the tubing to prevent lubricant from escaping the spraying chamber 910. In another embodiment, the sprayer ports 914 may be tubing connectors such that tubing is attached to the sprayer ports 914 on both the inside and outside of the spraying chamber 910. Such tubing connectors are well known in the art and include, but are not limited to, push-lok connectors.

Referring now to FIG. 9B, a side view of the spray enclosure 901 according to one disclosed embodiment of the present invention is shown. The bottom portion 904 is sloped downward from the edges to the middle such that lubricant not attaching to the wire collects at the center of the bottom of the bottom portion 904. A connector 916 is attached to the bottom of the bottom portion 904 and provides a drainage connection for the spraying chamber 910. The connector 916 may be push-lok tube connectors or other connectors well known in the art. The unused, collected lubricant may be withdrawn from the sprayer enclosure 901 for reuse or disposal.

Referring now to FIG. 10, an internal view of a spraying chamber 910 of the spray enclosure 901 according to one disclosed embodiment of the present invention is shown. Adjustable spraying nozzles 1002 are provided inside the spraying chamber 910 of the spray enclosure 901. Each adjustable spraying nozzle 1002 includes an intake block 1004, an adjustable arm 1006, and a spraying tip 1008. The intake block 1004 of the adjustable spraying nozzle 1002 receives lubricant and compressed air and mixes them before sending the combination down the adjustable arm 1006. The adjustable arm 1006 may be of a knuckled or jointed design and are well known in the art, however, other adjustable arms are also well known in the art. At the end of the adjustable arm 1006, a spraying tip 1008 is provided. The spraying tip 1008 may be made of brass, or other acceptable material without detracting from the spirit of the present invention. The spraying tip 1008 is adjustable to control the output of lubricant and air as well as the pattern of the sprayed mist of lubricant.

In the present embodiment, the adjustable spraying nozzles 1002 are attached to the internal wall of the spraying chamber 910 of the spray enclosure 20 by screwing the intake block 1004 onto exposed threading of the bolts securing the slit rubber grommets 922 to the wall of the spray enclosure 901, however, the adjustable spraying nozzles 1002 may be attached to the internal wall of the spraying chamber 910 in a variety of ways well known to those skilled in the art including, but not limited to, an independent mount welded to the internal wall. The adjustable spraying nozzles 1002 are positioned to ensure that lubricant is applied to the entirety of the exterior of the wire as the wire passes through the spray enclosure 901. Referring briefly to FIGS. 4, 6, and 10, lubricant may be applied in the spraying chamber 910 as disclosed in the spraying chamber 130 and with fixed sprayer nozzles 500.

Referring again to FIG. 10, the supply of lubricant and compressed air is distributed to the intake blocks 1004 of the adjustable spraying nozzles 1002 by T-connectors 1010 and tubing. As the tubing providing the lubricant and compressed air enters the spraying chamber 910 of the spray enclosure 901, each tube first connects to the input 1012 of a T-connector 1010. The T-connector 1010 may have a plurality of outputs 1014. The input 1012 and outputs 1014 may be a push-lok tubing connection, or any other tubing connection which are well known to those skilled in the art. In one embodiment, the T-connector 1010 has two outputs 1014. A tube then runs from one output 1014 to the intake block 1004 of one of the adjustable spraying nozzles 1002. Another tube runs from the remaining output 1014 to another T-connector 1010, and the connections are repeated in this second T-connector 1010 until lubricant or air is provided to each intake block 1004 of each adjustable spraying nozzle 1002. In one disclosed embodiment, there are three adjustable spraying nozzles 1002 and, for each supply of compressed air and lubricant, two T-Connectors 1012, however, a variety of distributing connectors and adjustable spraying nozzles 1002 do not detract from the spirit of the invention.

Figure 11A:
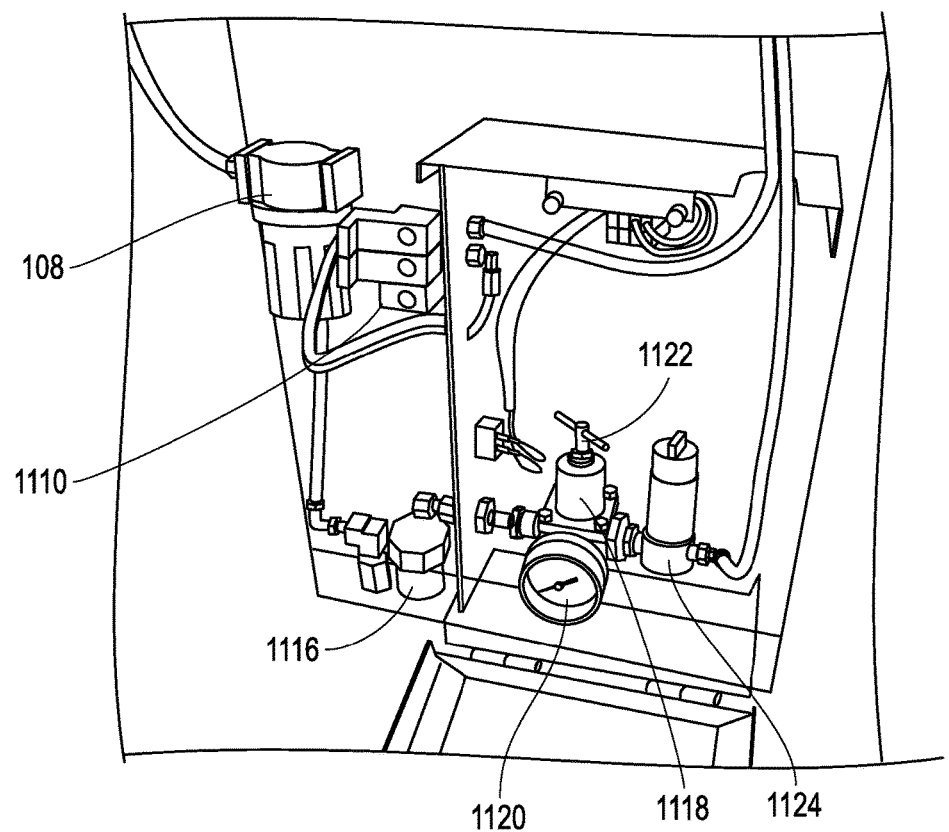
FIG. 11A depicts an air system and lubricant pump component of the lubricant applying apparatus.
Figure 11B:
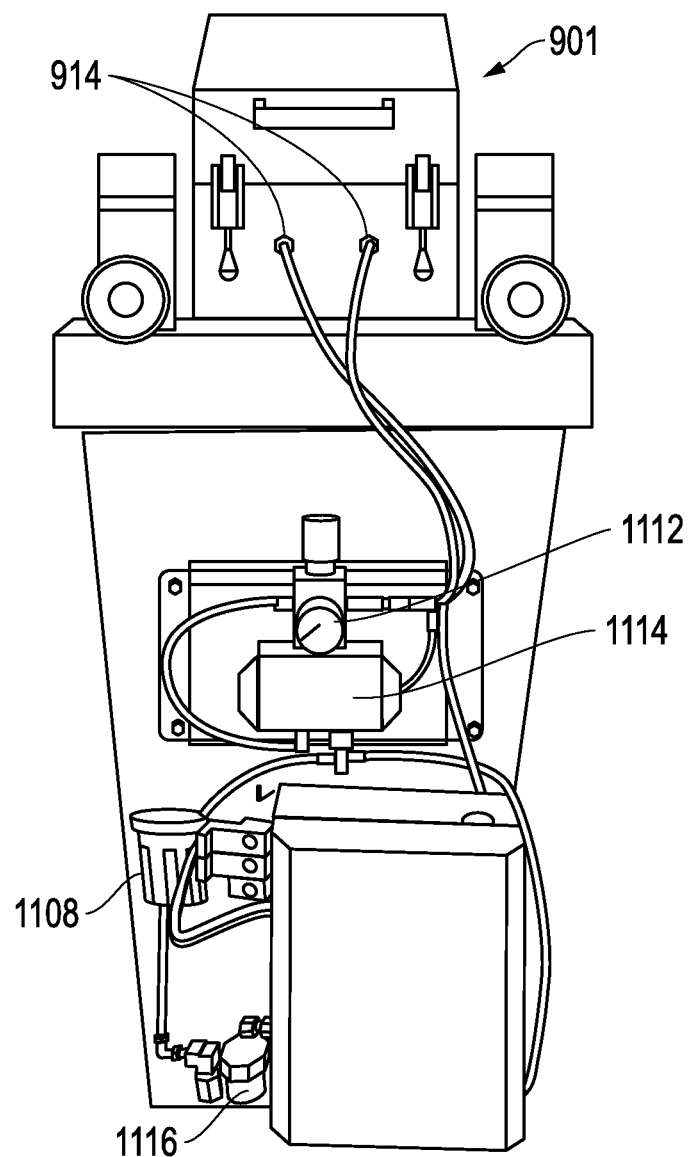
FIG. 11B depicts a back view of the lubricant applying apparatus.

Referring now to FIGS. 11A and 11B, by way of a non-limiting example, one embodiment of a spraying system 1102 is disclosed. The spraying system 1102 includes an air system 1104 and a lubricant pump system 1106. The spraying system 1102 is powered by compressed air, which is often readily available by way of a plant-wide compressed air distribution system or may be available by an independent air compressor.

Referring now to FIGS. 9A, 9B, 10, 11A, and 11B, compressed air from plant compressors is first supplied with the desired pressure to an air filter or dryer 1108 and then is provided to solenoid valves 1110. Solenoid valves 1110 are well known to those having ordinary skill in the art. The solenoid valves 1110 split the flow of compressed air into two paths, one path entering the spray enclosure 901 to be split among adjustable spray nozzles 1002 and the other path provides air to the power the lubricant pump system 1106.

Tubing connects one output of the solenoid valve 1110 to the air pressure regulator 1112 that regulates the air down to the desired pressure. Air pressure regulators 1112 are widely commercially available and well known to those skilled in the art. After the air pressure is regulated to the desired level in the air pressure regulator 1112, tubing directs the compressed air to the lubricant pump 1114. The lubricant pump 1114 includes an input for air from the air pressure regulator 1112 and an input for lubricant from a lubricant tank or tote. The lubricant pump 1114 is an air-power pump well known to those skilled in the art. The lubricant pump 1114 pulls lubricant from the tank or tote, through the lubricant pump 1114, and into the lubricant pump system 1106. Tubing then directs the lubricant from the output of the lubricant pump 1114 to the input of the primary lubricant filter 1116. The primary lubricant filter 1116 is one well known to those skilled in the art to remove contaminants from lubricants.

Tubing then connects the output of the primary lubricant filter 1116 to the input of the lubricant pressure regulator 1118. The lubricant pressure regulator 1118 has an adjustment valve 1122 and a gauge 1120, and is widely commercially available and well known to one having the ordinary skill in the art. Tubing the directs the lubricant from the lubricant pressure regulator 1118 to the secondary lubricant filter 1124. The secondary lubricant filter 1124 may be of the same type as the primary lubricant filter 1116 or may be of a different type and designed to filter different or smaller contaminants. The lubricant then exits the secondary lubricant filter 1124 and, via tubing, is directed into a sprayer port 914 to provide lubricant to each of the adjustable spraying nozzles 1002 as previously disclosed.

Figure 12:
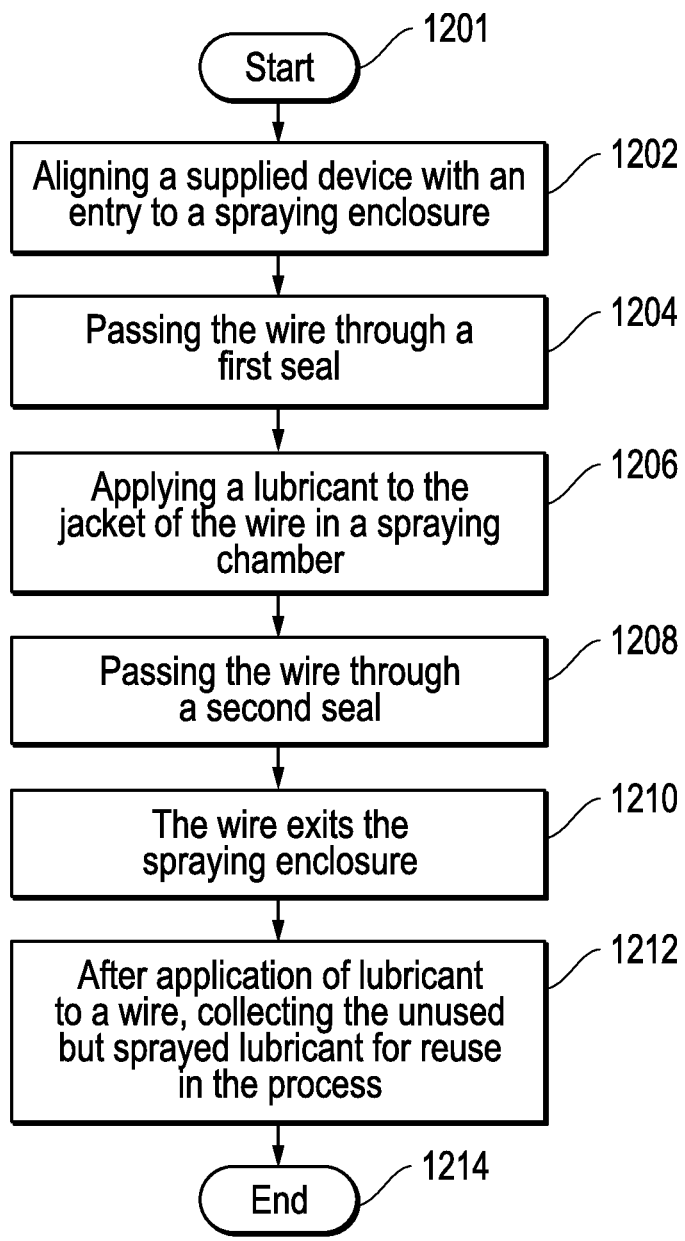
FIG. 12 depicts a method of applying a spray-on lubricant according to one embodiment of the present invention.

FIG. 12 illustrates a method for the spray-on application of a lubricant to a wire. The method begins with Start 1201. The wire with an extruded outer jacket is aligned with the entry opening of the spraying enclosure in step 1202. Next, the wire passes through a first seal designed to prevent contaminants from entering the chamber or lubricant from exiting the chamber in step 1204. The lubricant is sprayed onto the jacket of the wire while inside the spraying chamber in step 1206. In step 1208, the wire passes through a second seal designed to prevent contaminants from entering the chamber or lubricant from exiting the chamber. The wire exits the sprayer enclosure in step 1210. In step 1212, the unused lubricant that has been sprayed is collected in the bottom of the sprayer enclosure for reuse. The method ends in step 1214.

One skilled in the art will recognize that different embodiments may be formed in a similar manner having different characteristics depending on the need, performance, or some other criteria. It will thus be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

What is claimed is:

1. A process for the application of a lubricant to a wire during manufacturing, comprising:
    aligning the wire with an entry opening to a spraying enclosure, wherein the entry opening further comprises grommets;
    passing the wire through the grommets of the spraying enclosure, wherein the grommets form a seal around the wire as it is passed into the spraying enclosure;
    spraying the lubricant on the wire while in the spraying enclosure, wherein the unapplied, but sprayed, lubricant collects at the bottom of the spraying enclosure;
    passing the wire through an exit opening of the spraying enclosure, wherein the exit opening further comprises grommets;
    drying the wire with a drying device; and
    after application of lubricant to the wire, collecting the unused, but sprayed, lubricant.

2. The process of claim 1, wherein the step of spraying the lubricant includes spraying the lubricant on the wire through at least one adjustable spray nozzle contained within the spraying enclosure.

3. The process of claim 1, wherein the step of spraying the lubricant includes spraying the lubricant on the wire through an air system and a lubricant pump system.

4. The process of claim 3, wherein the air system includes aerosolizing the lubricant into a mist.

5. The process of claim 3, wherein the lubricant pump system includes filters and pumps transferring the lubricant to at least one adjustable spray nozzle.

6. The process of claim 1, wherein the grommets of the spraying enclosure impede the lubricant from escaping the spraying enclosure.

7. The process of claim 1, wherein the grommets of the spraying enclosure impede outside contaminants from entering the spraying enclosure.

8. The process of claim 1, wherein the spraying enclosure includes a gasket to separate the bottom portion of the spraying enclosure from the top portion of the spraying enclosure, the bottom portion collecting the unused, but sprayed, lubricant for reuse.

9. The process of claim 8, wherein the gasket impedes the lubricant from escaping the spraying enclosure.

10. The process of claim 8, wherein the gasket impedes outside contaminants from entering the spraying enclosure.

11. The process of claim 1, wherein the drying device includes an air knife to disperse excess lubricant from the wire as the wire exits the spraying enclosure.

12. The process of claim 1, wherein the grommets include slit grommets.

13. The process of claim 12, wherein the slit grommets include rubber slit grommets.

* * * * *